(12) United States Patent
Sekine

(10) Patent No.: US 11,544,853 B2
(45) Date of Patent: Jan. 3, 2023

(54) IMAGE PROCESSING APPARATUS AND NON-TRANSITORY COMPUTER READABLE MEDIUM FOR PREPARING COLOR CONVERSION MODEL USING COLOR DATA

(71) Applicant: FUJIFILM BUSINESS INNOVATION CORP., Tokyo (JP)

(72) Inventor: Satoshi Sekine, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 246 days.

(21) Appl. No.: 17/000,780

(22) Filed: Aug. 24, 2020

(65) Prior Publication Data

US 2021/0297644 A1    Sep. 23, 2021

(30) Foreign Application Priority Data

Mar. 23, 2020 (JP) .............................. JP2020-051365

(51) Int. Cl.
*G06T 7/11* (2017.01)
*G06T 7/90* (2017.01)

(52) U.S. Cl.
CPC .................. *G06T 7/11* (2017.01); *G06T 7/90* (2017.01); *G06T 2207/10024* (2013.01); *G06T 2207/20112* (2013.01)

(58) Field of Classification Search
CPC ............ G06T 7/11; G06T 2207/10024; G06T 2207/20112; G06T 11/001; H04N 1/6027; H04N 1/6086; H04N 9/68; H04N 1/6016
See application file for complete search history.

(56) References Cited

U.S. PATENT DOCUMENTS

| 5,202,935 A * | 4/1993 | Kanamori ................ H04N 1/62 |
| | | 382/162 |
| 9,305,359 B2 | 4/2016 | Suzuki |
| 10,602,026 B2 | 3/2020 | Iwafuchi et al. |
| 2019/0132565 A1 | 5/2019 | Iwafuchi et al. |

FOREIGN PATENT DOCUMENTS

| JP | 2014-164656 A | 9/2014 |
| JP | 2019-009764 A | 1/2019 |
| JP | 2019-083445 A | 5/2019 |

* cited by examiner

*Primary Examiner* — Christopher Wait
(74) *Attorney, Agent, or Firm* — Oliff PLC

(57) ABSTRACT

An image processing apparatus includes: an input device to which a pre-color conversion image and a post-color conversion image are input; and a processor. The processor is configured to execute a program to extract color data in a certain region of at least one of the pre-color conversion image and the post-color conversion image, change at least one of a position and a range of the certain region in a case where the extracted color data meet a certain condition, and prepare a color conversion model using color data in the certain region after being changed.

11 Claims, 8 Drawing Sheets

FIG. 7A
FIG. 7B
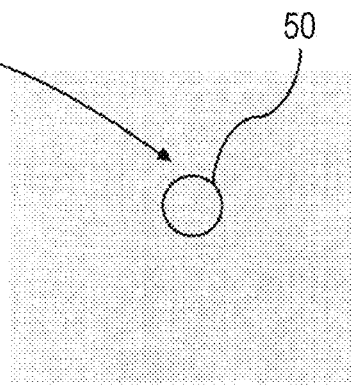
FIG. 8A
FIG. 8B
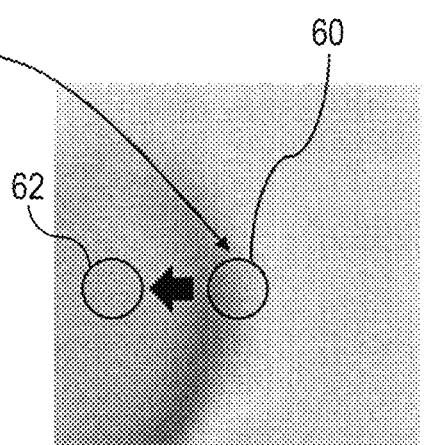
FIG. 9A
FIG. 9B
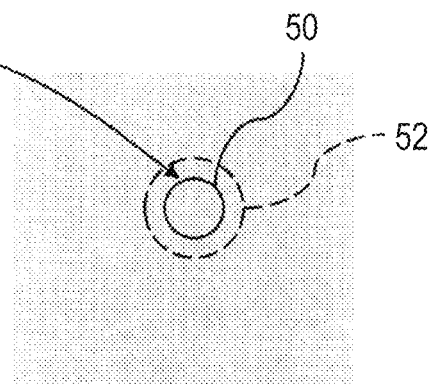

IMAGE PROCESSING APPARATUS AND NON-TRANSITORY COMPUTER READABLE MEDIUM FOR PREPARING COLOR CONVERSION MODEL USING COLOR DATA

CROSS-REFERENCE TO RELATED APPLICATIONS

This application is based on and claims priority under 35 USC 119 from Japanese Patent Application No. 2020-051365 filed Mar. 23, 2020.

BACKGROUND

(i) Technical Field

The present disclosure relates to an image processing apparatus and a non-transitory computer readable medium.

(ii) Related Art

There are an increasing number of users who capture and view digital images because of the widespread use of devices such as digital cameras, smartphones, and tablets. Various subjects are captured in the images in various environments under the influence of illumination light etc. Thus, the captured images are often different from what the users intended.

Thus, the color tint etc. of the captured images is occasionally changed.

Japanese Unexamined Patent Application Publication No. 2019-009764 describes an image processing apparatus that is capable of preparing a color conversion model by excluding color data with different retouch directionality, in order to prepare a more ideal color conversion model. The apparatus includes: a region determination unit that designates a region from which color data are to be extracted, for any one of an original pre-color conversion image and a post-color conversion image; a color data extraction unit that extracts information on color conversion between a pixel with image information in the region of the one of the original pre-color conversion image and the post-color conversion image designated by the region determination unit and a pixel with image information corresponding thereto of the other image; and a color conversion model preparation unit that prepares a color conversion model on the basis of a plurality of pieces of color conversion information extracted by the color data extraction unit.

Japanese Unexamined Patent Application Publication No. 2019-083445 describes an image processing apparatus that facilitates preparing color conversion characteristics for each capture setting information of a capture unit that captures image information. The apparatus includes: an image information acquisition unit that receives a set of image information including information on pre-color conversion images and information on post-color conversion images; and a color conversion coefficient calculation unit that prepares color conversion characteristics for performing color conversion on an image on the basis of capture setting information set from among capture conditions at the time when pre-color conversion images are captured.

SUMMARY

In the case where images have been captured under poor capture conditions or subjected to processing such as enlargement, reduction, or compression, for example, when a machine learning unit prepares color conversion characteristics (=a color conversion model) using a set of a pre-color conversion image and a post-color conversion image, the color conversion model is prepared on the basis of color data that are different from the original color data, and therefore the precision of the color conversion model may be reduced.

Aspects of non-limiting embodiments of the present disclosure relate to providing a technique of suppressing a reduction in the precision of a color conversion model when a machine learning unit prepares a color conversion model using a set of a pre-color conversion image and a post-color conversion image, even if a set of images with impaired color data or a set of images with wrong color data is used.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including: an input device to which a pre-color conversion image and a post-color conversion image are input; and a processor, in which the processor is configured to execute a program to extract color data in a certain region of at least one of the pre-color conversion image and the post-color conversion image, change at least one of a position and a range of the certain region in a case where the extracted color data meet a certain condition, and prepare a color conversion model using color data in the certain region after being changed.

BRIEF DESCRIPTION OF THE DRAWINGS

An exemplary embodiment of the present disclosure will be described in detail based on the following figures, wherein:

FIGS. 7A and 7B schematically illustrate a process according to the exemplary embodiment;

FIGS. 8A and 8B schematically illustrate a process of changing the position of a region of interest according to the exemplary embodiment;

FIGS. 9A and 9B schematically illustrate a process of changing the size of a region of interest according to the exemplary embodiment.

DETAILED DESCRIPTION

Figure 1:
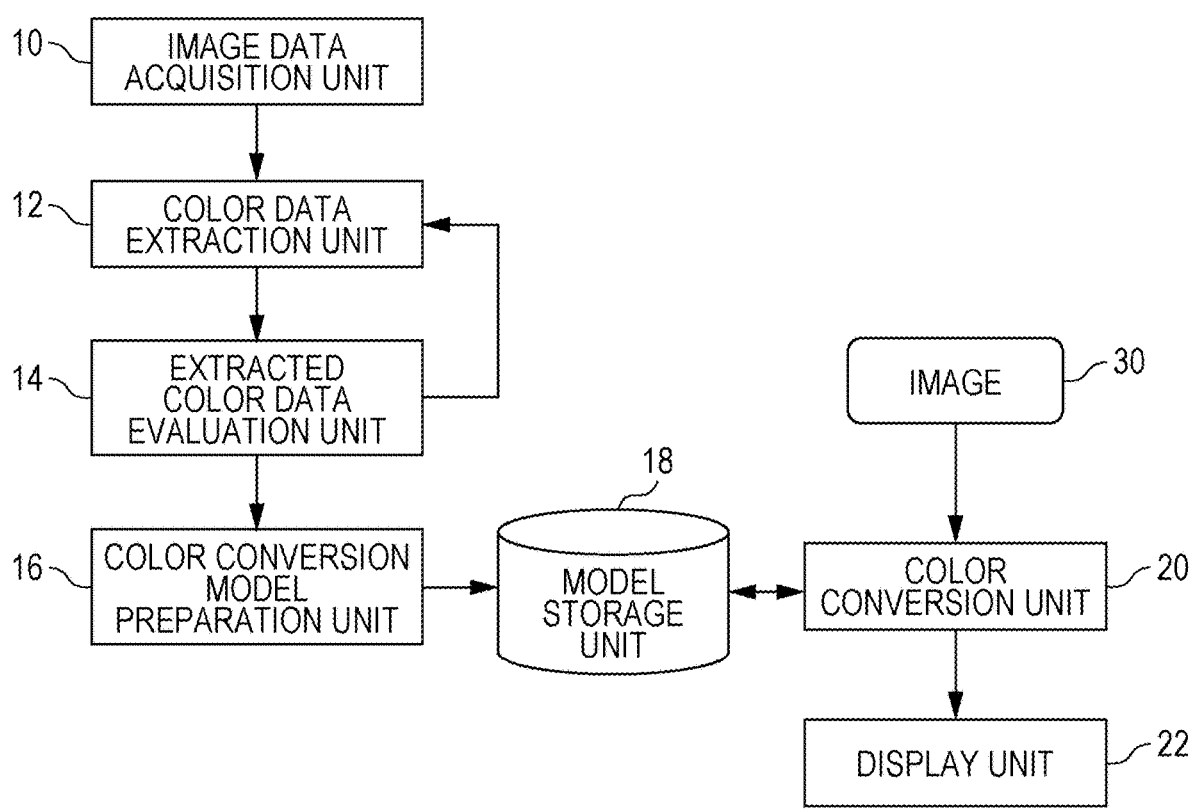
FIG. 1 is a functional block diagram of an image processing apparatus according to an exemplary embodiment.

An exemplary embodiment of the present disclosure will be described below with reference to the drawings.

<Basic Principle>

First, the basic principle of the present exemplary embodiment will be described.

A color conversion model may be prepared through machine learning using a plurality of sets of pre-color conversion images and post-color conversion images as teacher data. It is desirable to exclude less precise data from the teacher data themselves, since the precision of the teacher data affects the precision of the color conversion model. In the case where captured images are used as original images and subjected to color conversion, noise tends be caused in the images to result in less precise data in the case where the capture conditions are poor, the ISO sensitivity is high, camera shake blur due to a large number of pixels is caused, etc. In the case of compressed images such as JPEG images, meanwhile, the images include uncertainty compared to assumed color information because of a lossy compression process, a data reduction process, etc., and therefore also tend to result in less precise data. In the case where a CCD image sensor is used, further, color information is acquired from pixels in the Bayer arrangement, and thus the color information includes uncertainty compared to color information generated from a subject itself in principle.

Thus, in the present exemplary embodiment, it is evaluated whether or not color data extracted from at least one of the pre-color conversion images and the post-color conversion images are suitable as teacher data for machine learning, and only color data that may be evaluated as meeting a certain condition and thus suitable are used as the teacher data.

The "color data" are data that prescribe colors, and may be expressed with three components, namely red (R), green (G), and blue (B), for example. The suitability of the color data may be evaluated from the magnitude of the amount of variations in the color data. That is, the color data are evaluated as affected by noise etc. and thus unsuitable in the case where the amount of variations in the color data, specifically the amount of variations in the color data on pre-conversion images or the amount of variations in the color data on post-conversion images, meets a certain condition, specifically such an amount of variations is equal to or more than a threshold. The amount of variations in the color data (or the amount of variations in the color tendency) may be quantified by calculating the color difference in the color data. The color difference in the color data is the color difference of all the group of pixels that constitute a region of interest. The color data may be evaluated as unsuitable for all the region of interest, even if the color difference is less than a threshold at a certain location of the region of interest, if the color difference is equal to or more than the threshold at a different location.

In the case where the color data are evaluated as meeting a certain condition and thus unsuitable, color data are extracted again from the pre-color conversion image or the post-color conversion image. At this time, the amount of variations in the color data may be reduced by extracting color data again with the position of the region of interest, from which color data are extracted, changed. As a matter of course, the position of the region of interest may be changed and color data may be extracted again repeatedly until the amount of variations in color data sets is less than a threshold. If the specific direction in which the amount of variations in the color is reduced is known, the position of the region of interest is changed in such a direction. In addition, the range (size) of the region of interest may be increased or reduced, instead of or in addition to changing the position of the region of interest. Further, the region of interest from which color data sets are extracted may be divided into a plurality of regions to use only color data sets from one of the resulting regions. Since a certain number or more of color data sets need to be used as teacher data in order to secure the precision of machine learning, it is necessary that color data sets should be reduced only to that extent.

Aspects of variations in the region of interest for extracting color data again will be listed below. Such aspects may be combined with each other as appropriate.

(1) Change in position of region of interest
(2) Change in range (size) of region of interest
(3) Change in position and range of region of interest
(4) Division of region of interest The present exemplary embodiment will be described in more detail below.

<Configuration>

FIG. 1 is a functional block diagram of an image processing apparatus according to the present exemplary embodiment. The image processing apparatus includes an image data acquisition unit 10, a color data extraction unit 12, an extracted color data evaluation unit 14, a color conversion model preparation unit 16, a model storage unit 18, a color conversion unit 20, and a display unit 22.

The image data acquisition unit 10 acquires an image designated by a user. The user designates a set of pre-color conversion images (hereinafter referred to as "pre-conversion images") and post-color conversion images (hereinafter referred to as "post-conversion images") as teacher data which are necessary to prepare a color conversion model through machine learning. The image data acquisition unit 10 acquires the set of such images.

The color data extraction unit 12 extracts a plurality of color data sets in a region of interest from the set of the pre-conversion images and the post-conversion images which is acquired by the image data acquisition unit 10. That is, the color data extraction unit 12 extracts data sets including color data in a region of interest of the pre-conversion images (i.e. color data before color conversion) and color data in the same region of interest of the post-conversion images (i.e. color data after color conversion). The region of interest is a region that serves as a reference in preparing a color conversion model. While the region of interest may be set as desired, the region of interest may be a region designated by the user, or may be a specific image region set in advance. Alternatively, the region of interest may be a region in which a principal subject is present by default.

The extracted color data evaluation unit 14 evaluates the suitability of the color data sets which are extracted by the color data extraction unit 12. The extracted color data evaluation unit 14 evaluates the suitability using the magnitude etc. of the color difference of the extracted color data sets, selects only color data sets evaluated as suitable, and outputs the selected color data sets to the color conversion model preparation unit 16. In the case where the extracted color data sets are evaluated as unsuitable, the extracted color data evaluation unit 14 outputs an indication that informs the color data extraction unit 12 accordingly. In this case, the color data extraction unit 12 extracts different color data sets again with the region of interest varied. To vary the region of interest, at least one of the position of the region of interest and the size of the region of interest is varied. The region of interest is varied and color data sets are extracted again by the color data extraction unit 12 repeatedly until the extracted color data evaluation unit 14 evaluates the extracted color data sets as suitable. The method of evaluation by the extracted color data evaluation unit 14 will be further discussed later.

The color conversion model preparation unit 16 prepares a color conversion model by performing machine learning by inputting the color data sets which are extracted by the color data extraction unit 12 and evaluated as suitable by the extracted color data evaluation unit 14 to a learning unit as teacher data. The "color conversion model" is a model that indicates the relationship between information on pre-color conversion images and information on post-color conversion images. For example, when color conversion vectors that correspond to a function that represents the relationship between the information on pre-color conversion images and the information on post-color conversion images and that have the information on pre-color conversion images as the start point and that have the information on post-color conversion images as the end point are considered, the "color conversion model" may be considered as a collection of such color conversion vectors (color conversion vector group). For example, in the case where the image information is RGB data which are composed of red (R), green (G), and blue (B), and when the information on pre-color conversion images is defined as (Ra, Ga, Ba) and the information on post-color conversion images is defined as (Rb, Gb, Bb), the "color conversion model" represents the relationship of conversion between (Ra, Ga, Ba) and (Rb, Gb, Bb). The "conversion relationship" indicates conversion information for converting the information on pre-color conversion images into the information on post-color conversion images. The conversion relationship may be prepared as a look-up table (LUT). The LUT may be a multi-dimensional LUT, or may be a one-dimensional LUT. The conversion relationship may be prepared as a multi-dimensional matrix, rather than an LUT.

The conversion relationship is information for converting, in the case where the image information is RGB data, the information on pre-color conversion images (Ra, Ga, Ba) into the information on post-color conversion images (Rb, Gb, Bb) as follows:

$(Ra, Ga, Ba) \rightarrow (Rb, Gb, Bb)$

The use of this conversion relationship allows reproduction of color conversion that is similar to the color conversion performed previously. That is, when there occurs new information on pre-color conversion images, information on post-color conversion images may be generated by performing color conversion that is similar to the color conversion performed previously by performing color conversion using the conversion relationship.

In the case where the conversion relationship is a multi-dimensional LUT, the conversion relationship is a three-dimensional LUT, and directly converts (Ra, Ga, Ba) into (Rb, Gb, Bb). That is, the conversion relationship performs the following conversion:

$(Ra, Ga, Ba) \rightarrow (Rb, Gb, Bb)$

In the case where the conversion relationship is a one-dimensional LUT, meanwhile, the conversion relationship performs conversion for each of R, G, and B. That is, the conversion relationship performs the following conversion:

$Ra \rightarrow Rb$ $Ga \rightarrow Gb$ $Ba \rightarrow Bb$

While conversion is performed in the RGB color space in the present exemplary embodiment, conversion may be performed in a different color space such as the CMYK color space. In this case, the image information is CMYK data which are composed of cyan (C), magenta (M), yellow (Y), and black (K). In the case where the conversion relationship is a multi-dimensional LUT, the conversion relationship is a four-dimensional LUT, and converts the information on pre-color conversion images (Ca, Ma, Ya, Ka) into the information on post-color conversion images (Cb, Mb, Yb, Kb) as follows:

$(Ca, Ma, Ya, Ka) \rightarrow (Cb, Mb, Yb, Kb)$

In the case where the conversion relationship is a one-dimensional LUT, meanwhile, the conversion relationship performs conversion for each of C, M, Y, and K. That is, the conversion relationship performs the following conversion:

$Ca \rightarrow Cb$ $Ma \rightarrow Mb$ $Ya \rightarrow Yb$ $Ka \rightarrow Kb$

The color conversion model which is prepared by the color conversion model preparation unit 16 is stored in the model storage unit 18. In the case where the color conversion model is a three-dimensional LUT, the three-dimensional LUT is stored in the model storage unit 18.

The color conversion model preparation unit 16 may prepare a continuous color conversion relationship by interpolating, as appropriate, a color conversion relationship with no color data set in the prepared color conversion model using a known interpolation technique. Specifically, in the case where a three-dimensional LUT prescribes $(Ra1, Ga1, Ba1) \rightarrow (Rb1, Gb1, Bb1)$ and $(Ra2, Ga2, Ba2) \rightarrow (Rb2, Gb2, Bb2),$ a color conversion relationship may be prepared through linear interpolation or non-linear interpolation for image information between (Ra1, Ga1, Ba1) and (Ra2, Ga2, Ba2), for example.

The color conversion unit 20 executes color conversion on an input image using the color conversion model which is stored in the model storage unit 18, and displays a post-conversion image on the display unit 22.

Figure 2:
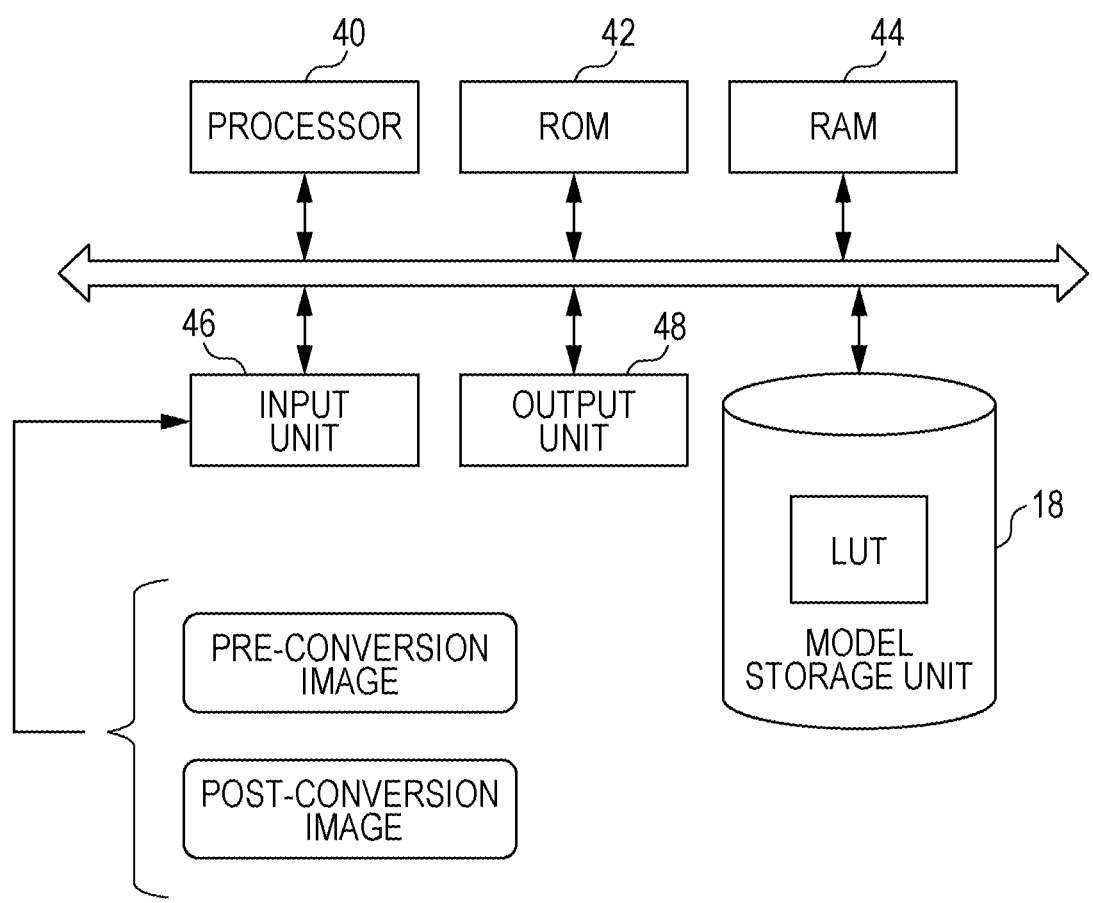
FIG. 2 is a block diagram illustrating the configuration of the image processing apparatus according to the exemplary embodiment.

FIG. 2 is a block diagram illustrating the configuration of the image processing apparatus according to the present exemplary embodiment. The image processing apparatus is constituted of a computer, and includes a processor 40, a read only memory (ROM) 42, a random access memory (RAM) 44, an input unit 46, an output unit 48, and the model storage unit 18.

The processor 40 implements the image data acquisition unit 10, the color data extraction unit 12, the extracted color data evaluation unit 14, the color conversion model preparation unit 16, and the color conversion unit 20 in FIG. 1 by reading a process program stored in the ROM 42 or a different program memory and executing the process program using the RAM 44 as a work memory.

The input unit 46 is constituted from a keyboard, a mouse, a scanner, a touch screen, a communication interface, etc., and receives a set of pre-conversion images and post-conversion images designated by the user.

The output unit 48 is constituted of a display device etc. that includes a touch screen, and outputs a post-conversion image that has been subjected to color conversion by the processor 40. The output unit 48 may include a communication interface, and may output the post-conversion image to a different computer via a communication line.

As discussed already, the model storage unit 18 stores a color conversion model. The color conversion model is expressed as a three-dimensional LUT, for example. The processor 40 prepares a color conversion model by inputting a set of pre-conversion images and post-conversion images, which has been input, to a learning unit as teacher data. The learning unit may be a neural network (NN), a convolutional neural network (CNN), etc., for example, but is not limited to a particular model.

The processors 40 evaluates, as the extracted color data evaluation unit 14, the suitability of the color data sets which are extracted from a region of interest in a plurality of sets of pre-conversion images and post-conversion images. Specifically, the processor 40 determines, for at least either color data on a group of pixels extracted from a region of interest in the pre-conversion images or color data on a group of pixels extracted from the region of interest in the post-conversion images, whether or not the difference (color difference) in the color data is large enough to be equal to or more than a threshold set in advance. Noise tends to be caused in the case where the ISO sensitivity of the pre-conversion images, that is, the original images, is high, in the absence of a low-pass filter, in the case of camera shake blur during capture, etc. If noise is caused, color data that are different from the subject are contained in the original images. Thus, if noise is caused in the region of interest, the color difference in the color data is large enough to be equal to or more than the threshold. If such noise is contained in the teacher data which are used for machine learning by the learning unit, the precision of a color conversion model prepared through machine learning is reduced. Thus, the processor 40 compares the color difference in the color data with the threshold, and evaluates the color data as unsuitable if the color difference is equal to or more than the threshold, and as suitable if the color difference is less than the threshold. In the case where the color difference in the color data is equal to or more than the threshold and the color data are determined as unsuitable, the processor 40 changes the position of the region of interest, extracts color data again, and determines again whether or not the color difference in the color data which have been extracted again is equal to or more than the threshold. If the color difference is equal to or more than the threshold, the processor 40 further changes the position of the region of interest and extracts color data again. The above processes are repeatedly executed.

Specifically, the processes are performed as follows. The processor 40 extracts color data from a group of pixels that constitute a first region of interest in pre-conversion images, calculates the color difference in the color data, and compares the color difference with a threshold. If the color difference is equal to or more than the threshold, the processor 40 changes the position of the first region of interest to obtain a second region of interest, extracts color data again from a group of pixels that constitute the second region of interest, calculates the color difference in the color data, and compares the color difference with the threshold. The positional relationship between the first region of interest and the second region of interest may be determined as desired. For example, the second region of interest may be determined by moving the first region of interest by a number of pixels set in advance in the horizontal direction of the pre-conversion images, moving the first region of interest by a number of pixels set in advance in an oblique direction of the pre-conversion images, etc. Since the position of the region of interest is changed for the purpose of making the color difference in the color data less than the threshold, the position of the region of interest may be changed in a direction in which the color difference in the color data is reduced on the basis of the distribution of the color difference in the color data.

Alternatively, the processor 40 determines, for at least either color data on a group of pixels extracted from a region of interest in the pre-conversion images or color data on a group of pixels extracted from the region of interest in the post-conversion images, whether or not the ISO sensitivity is high enough to be equal to or more than a threshold set in advance. If the ISO sensitivity is equal to or more than the threshold, the processor 40 evaluates the color data which are extracted from the default region of interest as unsuitable, increases the size of the region of interest, and extracts color data again. Since an increase in the size of the region of interest occasionally causes an increase in the color difference in color data, it is desirable that the size of the region of interest should be increased in the range in which the color difference is less than the threshold. The ISO sensitivity may be acquired from Exif information on the pre-conversion images, for example. The size of the region of interest is increased also in the case where the pre-color conversion images are compressed images such as JPEG images.

Alternatively, in the case where the post-color conversion images are images that have been not only subjected to color conversion but also trimmed, the processor 40 may not only change the position of the region of interest but also change the trimming position when the color difference in the color data in the region of interest is equal to or more than a threshold.

In the case where the extracted color data sets are evaluated as suitable, the processor 40 executes machine learning using the color data sets as teacher data. The teacher data are a set of color data in pre-conversion images and color data in post-conversion images. The color data in the pre-conversion images and the post-conversion images are a statistical value, specifically an average value, of color data for a group of pixels that constitute the region of interest.

In the present exemplary embodiment, it is not necessary that the image processing apparatus should include the model storage unit 18, and an external server etc. may include the model storage unit 18. In this case, when the processor 40 prepares a color conversion model, the processor 40 stores the prepared color conversion model in a model storage device of the external server etc. via a communication interface and a communication line. In the case where a sample image is input, the processor 40 reads the corresponding color conversion model from the model storage device of the external server, performs color conversion, and outputs the resulting color conversion model to the output unit 48.

While the processor 40 prepares a color conversion model and executes color conversion using the prepared color conversion model, a processor that prepares (including relearning) a color conversion model and a processor that performs color conversion using the color conversion model may be separate from each other. Rather than including both a function of preparing a color conversion model and a function of executing color conversion using the color conversion model and outputting the resulting color conversion model, the image processing apparatus according to the present exemplary embodiment may include only a function of preparing (including re-learning) a color conversion model or only a function of executing color conversion using the color conversion model and outputting the resulting color conversion model.

The processor 40 refers to hardware in a broad sense. Examples of the processor 40 include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The term "processor" is broad enough to encompass one processor or plural processors in collaboration which are located physically apart from each other but may work cooperatively. The order of operations of the processor is not limited to one described herein, and may be changed.

<Process Flowchart>

Figure 3:
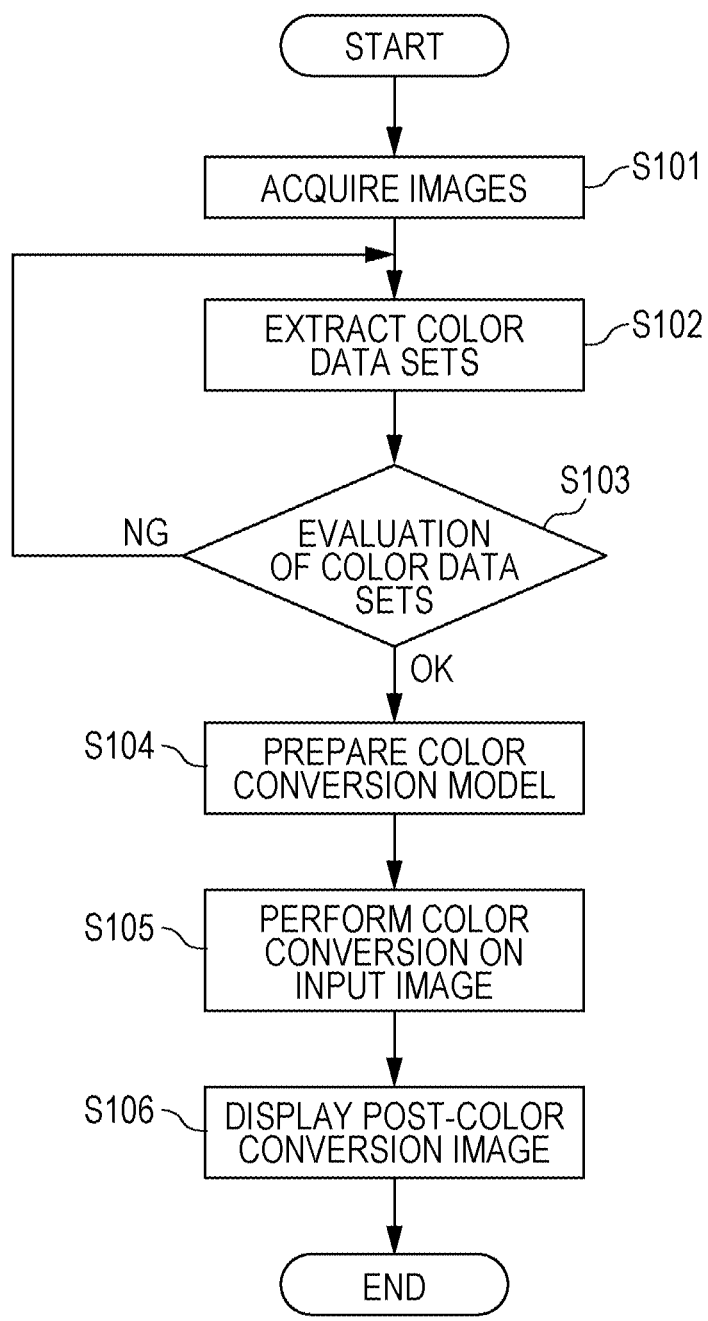
FIG. 3 is an overall process flowchart according to the exemplary embodiment.

FIG. 3 is a process flowchart according to the exemplary embodiment.

First, the processor 40 acquires sets of image information to serve as teacher data (S101). The sets of image information are sets of pre-conversion images and post-conversion images. It is desirable to acquire as many sets as possible.

Next, the processor 40 extracts and acquires a plurality of color data sets in a region of interest from the plurality of sets of pre-conversion images and post-conversion images (S102). That is, the color data extraction unit 12 extracts data sets including color data in a region of interest of the pre-conversion images (i.e. color data before color conversion) and color data in the same region of interest of the post-conversion images (i.e. color data after color conversion). The region of interest may be a region designated by the user, or may be a specific image region set in advance. The region of interest may be set as a region of interest in a pre-conversion image, and may be set as a region of interest in a post-conversion image. That is, the region of interest may be set in one of a pre-conversion image and a post-conversion image. In the case where color conversion is performed for a portion of a garment as a commodity, the portion of the garment may be set as the region of interest. It is required that the color of a commodity should be subjected to more strict color reproduction, and that the color of the actual commodity and the color of the commodity displayed as an image should coincide with each other. Therefore, the color of a commodity tends to be subjected to color conversion.

Next, the processor 40 evaluates the suitability of the color data sets which are extracted in S102 (S103). The suitability of the color data sets may be evaluated using only color data extracted from the pre-conversion images, using only color data extracted from the post-conversion images, or using both color data extracted from the pre-conversion images and color data extracted from the post-conversion images.

In the case where the color data sets are evaluated as suitable (YES in S103), the processor 40 prepares a color conversion model (S104) by performing machine learning using a statistical value, specifically an average value, of the color data sets as teacher data. In the case where the color conversion model is prescribed by a three-dimensional LUT, the model converts (Ra, Ga, Ba) into (Rb, Gb, Bb) as:

$$(Ra, Ga, Ba) \rightarrow (Rb, Gb, Bb)$$

The three-dimensional LUT is a discrete table. Thus, a continuous color conversion function may be obtained by interpolating color data that are not prescribed by the three-dimensional LUT through linear interpolation or non-linear interpolation. The prepared color conversion model is stored in the model storage unit 18.

In the case where the color data sets are evaluated as unsuitable (NG in S103), on the other hand, the processor 40 repeatedly performs the processes in and after S102, to extract color data sets again from a different region of interest (S102) and evaluate the suitability of the color data sets (S103). The processes in S102 and S103 are repeatedly executed until the color data sets are evaluated as suitable in S103. However, an upper limit may be set on the number of repetitions. In this case, a color data set that is the most suitable in the range of the repeated processes may be selected.

After preparing a color conversion model and storing the color conversion model in the model storage unit 18, the processor 40 receives an image to be subjected to color conversion from the input unit 46 (S104), reads the color conversion model from the model storage unit 18, and performs color conversion (S105). The image which has been subjected to color conversion is output to the output unit 48 to be displayed (S106).

The evaluation process in S103 will be described in detail below.

<Evaluation with Color Difference>

Figure 4:
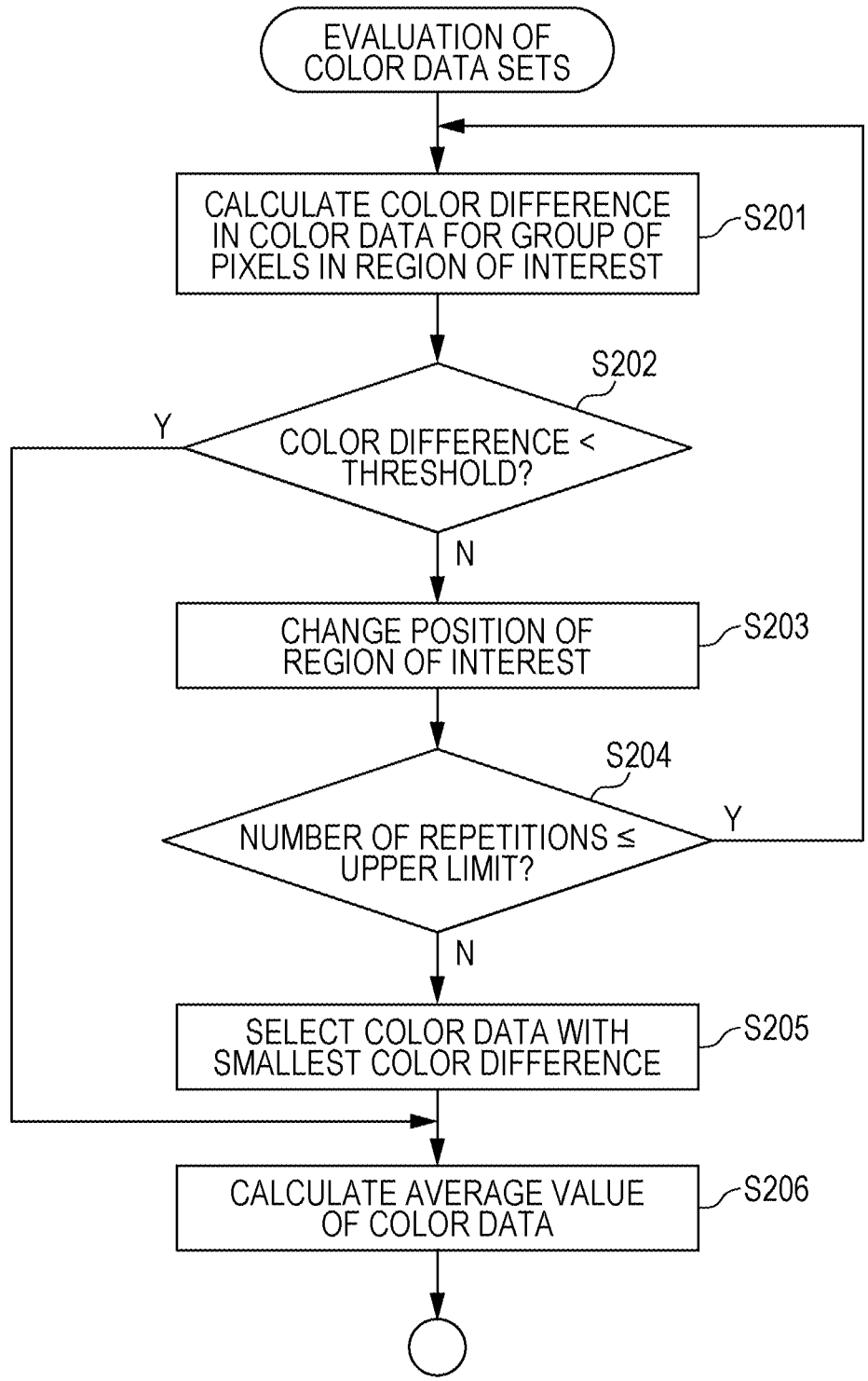
FIG. 4 is a flowchart of a process of evaluating color data sets according to the exemplary embodiment.

FIG. 4 illustrates a flowchart of an evaluation process which uses the color difference in color data.

The processor calculates 40, for color data extracted from a region of interest in pre-conversion images, for example, the color difference in the color data (S201). If two color data are defined as (Ri, Gi, Bi) and (Rj, Gj, Bj), the color difference may be defined as a Euclidean distance constituted in a linear three-dimensional space with R, G, and B, for example, as follows:

$$\text{color difference} = \{(Ri-Rj)^2 + (Gi-Gj)^2 + (Bi-Bj)^2\}^{0.5}$$

However, the present disclosure is not limited thereto. The color difference may also be calculated in the Lab color space.

Next, the processor 40 compares the calculated color difference with a threshold set in advance (S202). That is, the processor 40 determines whether or not the color difference is less than the threshold. This determination is executed among all the adjacent pixels. If the color difference is less than the threshold among all the adjacent pixels, it is considered that the color data which are extracted in S201 are suitable, and the processor 40 calculates an average value of the color data and an average value of color data on the post-conversion images corresponding thereto, and outputs a set of such average values as teacher data (S206).

If the color difference is equal to or more than the threshold between at least one pair of adjacent pixels, on the other hand, it is considered that the color data are unsuitable, and the processor 40 changes the position of the region of interest in the pre-conversion images (S203). The region of interest before being changed and the region of interest after being changed may partially overlap each other, and may not overlap each other at all. After the position of the region of interest is changed, the number of such position changes is counted as the number of repetitions, and it is determined whether or not the number of repetitions is equal to or less than an upper limit value set in advance (S204).

If the number of repetitions is equal to or less than the upper limit value, the processes in and after S201 are repeatedly performed for the new region of interest which is determined in S203. If the number of repetitions exceeds the upper limit value, the process in S201 is not repeated, and color data with the smallest color difference are selected among the color data which have been repeatedly extracted so far (S205). The processor 40 proceeds to the process in S206, and calculates an average value of the color data and an average value of color data on the post-conversion images corresponding thereto, and outputs a set of such average values as teacher data.

As described above, a color conversion model is prepared using the color difference in color data as an evaluation parameter, and using an average value of color data with a color difference that is less than a threshold, or color data with the smallest color difference, as teacher data.

In the processes in FIG. 4, it is considered that color data are unsuitable if the color difference is equal to or more than the threshold between at least one pair of adjacent pixels. However, the number of pairs of adjacent pixels between which the color difference is equal to or more than the threshold may be compared with a second threshold, and it may be considered the color data are unsuitable in the case where the number of such pairs is equal to or more than the second threshold. In short, it may be considered that color data are unsuitable in the case where the number of locations at which the amount of variations in the color is large is equal to or more than a certain value.

In the processes in FIG. 4, in addition, in the case where the number of repetitions exceeds the upper limit value, color data with the smallest color difference are selected. Instead of or in addition to this process, a group of color data may be sorted in the ascending order of the color difference, the color data may be divided into a group of color data with a color difference that is less than the threshold and a group of color data with a color difference that is equal to or more than the threshold, and only the group of color data with a color difference that is less than the threshold may be selected. That is, a color conversion model may be prepared by dividing color data for a group of pixels that constitute the region of interest using a certain criterion (e.g. color difference), and sorting out the color data after being divided.

<Evaluation with ISO Sensitivity or Use of Compression>

Figure 5:
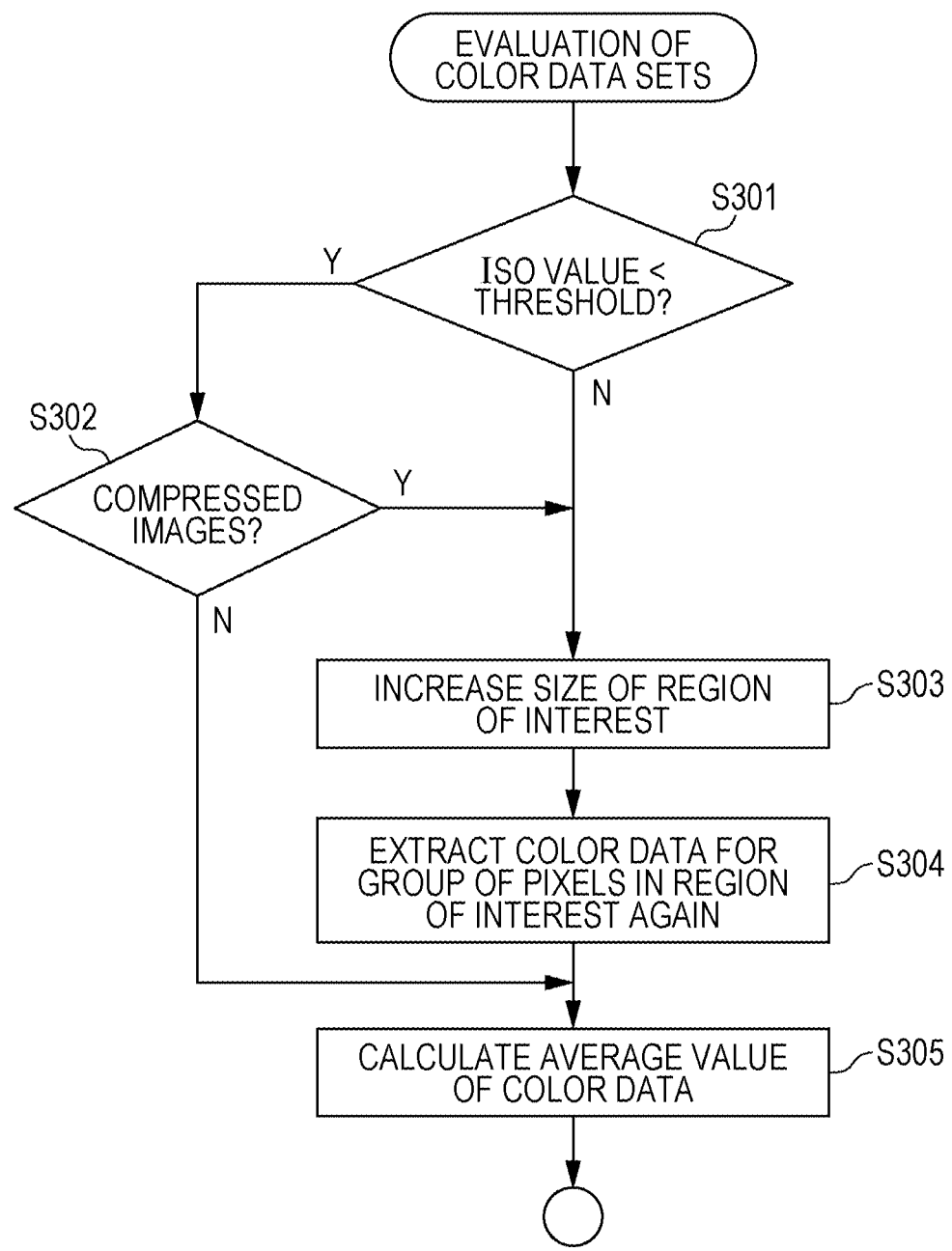
FIG. 5 is a flowchart of another process of evaluating color data sets according to the exemplary embodiment.

FIG. 5 is a flowchart of an evaluation process which uses the ISO sensitivity or the use of compression.

The processor 40 acquires the ISO sensitivity of the pre-conversion images from the Exif information, for example, and determines whether or not the ISO sensitivity is less than a threshold set in advance (S301).

If the ISO sensitivity is less than the threshold (YES in S301), the processor 40 further determines whether or not the pre-conversion images are compressed images such as JPEG images (S302).

If the ISO sensitivity is less than the threshold and the pre-conversion images are not compressed images (NO in S302), the processor 40 considers that the color data which are extracted from the region of interest are suitable, and calculates an average value of the color data and an average value of color data on the post-conversion images corresponding thereto, and outputs a set of such average values as teacher data (S305).

In the case where the ISO sensitivity is equal to or more than the threshold (NO in S302), or in the case where the pre-conversion images are compressed images (YES in S302), on the other hand, the processor 40 considers that the color data which are extracted from the region of interest are unsuitable, and increases the size of the region of interest (S303), and extracts color data again from the new region of interest with the increased size (S304). The processor 40 calculates an average value of the color data and an average value of color data on the post-conversion images corresponding thereto, and outputs a set of such average values as teacher data (S305).

In the processes in FIG. 5, an evaluation process that uses the color difference in color data as illustrated in FIG. 4 may be added between the processes in S304 and S305.

<Evaluation with Trimmed Images>

Figure 6:
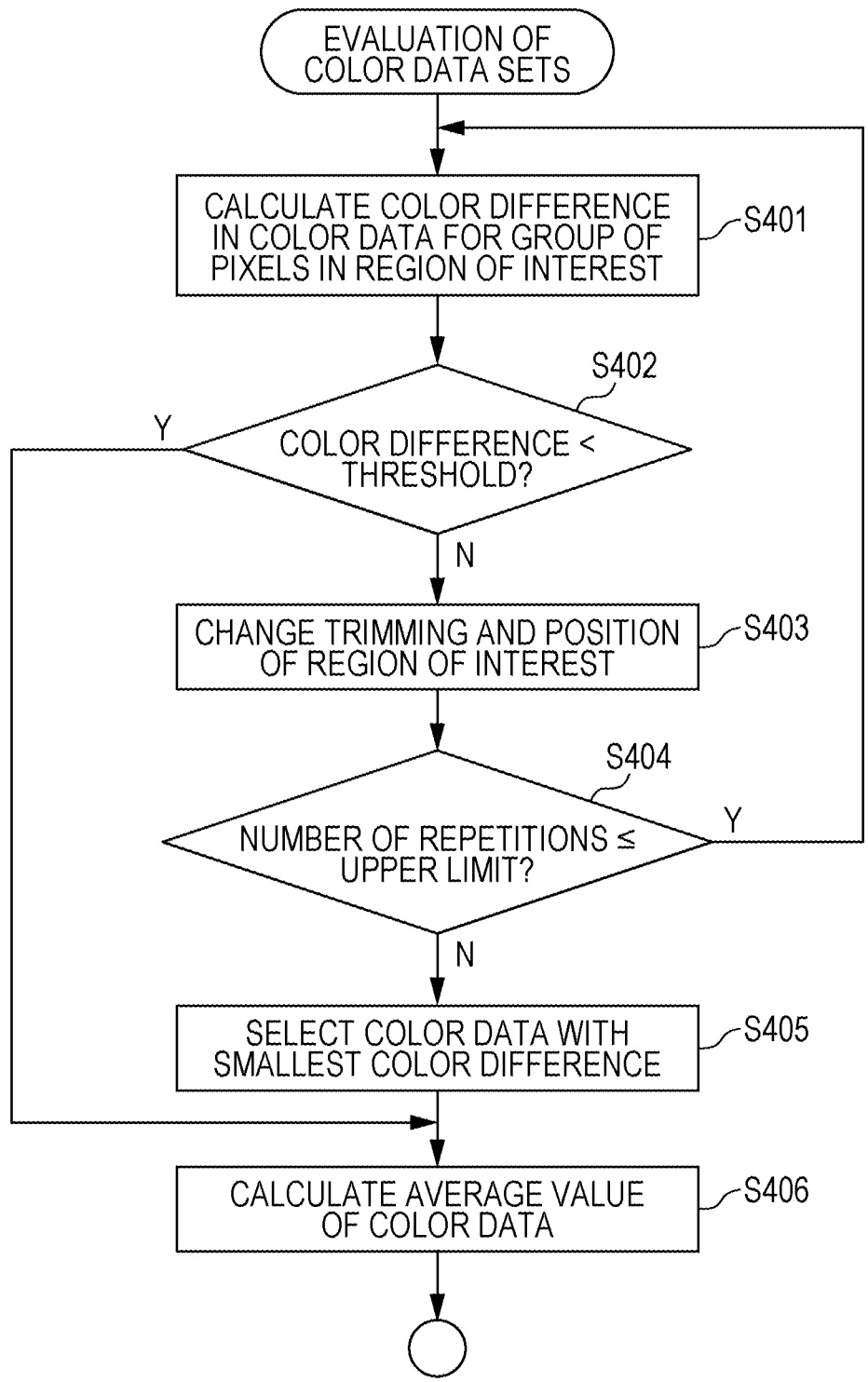
FIG. 6 is a flowchart of still another process of evaluating color data sets according to the exemplary embodiment.

FIG. 6 is a flowchart of an evaluation process for the case where post-conversion images are images obtained by trimming pre-conversion images.

The processes in FIG. 6 are basically the same as the processes in FIG. 4. The color difference in color data for a group of pixels that constitute the region of interest is calculated (S401), and the calculated color difference is compared with a threshold (S402). It should be noted, however, that the color difference in color data for a group of pixels that constitute the region of interest in post-conversion images, that is, trimmed images, is calculated.

Next, if the calculated color difference is less than the threshold (YES in S402), an average value of the color data and an average value of color data on the pre-conversion images corresponding thereto are calculated, and a set of such average values is output as teacher data (S406).

If the color difference is equal to or more than the threshold (NO in S402), on the other hand, the processor 40 changes the location of trimming and the position of the region of interest (S403). The location of trimming may be changed automatically by the processor 40, or manually by the user using an input device such as a mouse. In the case where the output unit 48 is constituted as a touch screen, both a pre-conversion image and a post-conversion image may be displayed on the touch screen, and the user may operate the touch screen to change the trimming position. The change in the location of trimming may include a change in the size of the location of trimming. Processes that are the same as those in FIG. 4 are repeatedly performed (S404 and S405) after the location of trimming and the region of interest are changed.

While the location of trimming and the position of the region of interest are changed in the processes in FIG. 6, only the location of trimming or only the position of the region of interest may be changed.

Next, specific examples of images will be described.

FIGS. 7A and 7B schematically illustrate a case where the color difference in color data for a group of pixels that constitute a region of interest is less than a threshold. FIG. 7A illustrates an example of a pre-conversion image, and illustrates a region of interest 50. FIG. 7B is a partial enlarged view illustrating the vicinity of the region of interest 50 illustrated in FIG. 7A. In the case where the color difference in color data in the region of interest 50 is less than a threshold, it is considered that such color data are suitable as teacher data, and an average value of the color data is calculated using the group of pixels that constitute the region of interest 50.

FIGS. 8A and 8B schematically illustrate a case where the color difference in color data for a group of pixels that constitute a region of interest is equal to or more than a threshold. FIG. 8A illustrates an example of a pre-conversion image, and illustrates a region of interest 60. FIG. 8B is a partial enlarged view illustrating the vicinity of the region of interest 60 illustrated in FIG. 8A. In the case where the color difference in color data in the region of interest 60 is equal to or more than a threshold, it is considered that such color data are unsuitable as teacher data, and the region of interest 60 is changed in position to a region of interest 62. After color data are extracted again from the region of interest 62, the color difference in the color data is compared with the threshold. If the color difference is less than the threshold, an average value of the color data is calculated using the group of pixels that constitute the region of interest 62 as in FIG. 7B.

FIGS. 9A and 9B schematically illustrate a case where the ISO sensitivity of a pre-conversion image (or a post-conversion image) is equal to or more than a threshold. FIG. 9A illustrates an example of a pre-conversion image, and illustrates a region of interest 50. FIG. 9B is a partial enlarged view illustrating the vicinity of the region of interest 50 illustrated in FIG. 9A. In the case where the ISO sensitivity is equal to or more than the threshold, it is considered that the color data are unsuitable. The region of interest 50 is increased in size to obtain a region of interest 52 (indicated by the dotted line in the drawing), and color data are extracted again from a group of pixels that constitute the region of interest 52.

After color data are extracted again from the region of interest 52, an average value of the color data is calculated using the group of pixels that constitute the region of interest 52.

Figure 10A:
FIGS. 10A to 10D schematically illustrate a change in the position of trimming and a change in the position of a region of interest according to the exemplary embodiment.
Figure 10B:
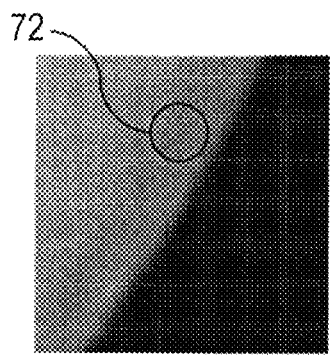
Figure 10C:
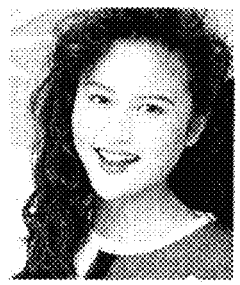
Figure 10D:
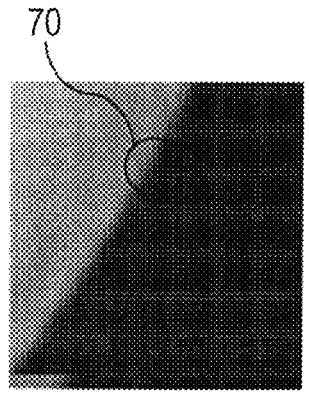

FIGS. 10A to 10D schematically illustrate a case where a post-conversion image is a trimmed image. FIG. 10A illustrates an example of a pre-conversion image. FIG. 10C illustrates an example of a post-conversion image, which is an image obtained by trimming the pre-conversion image illustrated in FIG. 10A. FIG. 10D is a partial enlarged view illustrating a region of interest 70 in the post-conversion image illustrated in FIG. 10C which has been trimmed. In the case where the color difference in color data in the region of interest 70 is equal to or more than a threshold, the location of trimming and the position of the region of interest are changed. FIG. 10B illustrates an example of a post-conversion image after the location of trimming and the position of the region of interest are changed, illustrating a region of interest 72 after being changed. The location of trimming after being changed is indicated as a rectangular region in FIG. 10A. In the case where the color difference in color data in the region of interest 72 is equal to or more than the threshold, it is considered that such color data are unsuitable as teacher data, and the region of interest 72 is further changed in position. After color data are extracted again from the region of interest 72, the color difference in the color data is compared with the threshold. If the color difference is less than the threshold, an average value of the color data is calculated using the group of pixels that constitute the region of interest 72.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
    an input device to which a pre-color conversion image and a post-color conversion image are input; and
    a processor,
    wherein the processor is configured to execute a program to
        extract color data in a certain region of at least one of the pre-color conversion image and the post-color conversion image,
        change at least one of a position and a range of the certain region in a case where the extracted color data meet a certain condition, and
        prepare a color conversion model using color data in the certain region after being changed.

2. The image processing apparatus according to claim 1, wherein the processor changes at least one of the position and the range of the certain region in a case where an amount of variations in the extracted color data is equal to or more than a threshold.

3. The image processing apparatus according to claim 1, wherein the processor divides the certain region in a case where an amount of variations in the extracted color data is equal to or more than a threshold, and
    the processor prepares the color conversion model using the color data after being divided.

4. The image processing apparatus according to claim 1, wherein the processor calculates an average value of color data for a group of pixels included in the certain region after being changed, and
    the processor prepares the color conversion model using the average value.

5. The image processing apparatus according to claim 1, wherein the processor increases the range of the certain region in a case where an ISO sensitivity of the pre-color conversion image is equal to or more than a threshold.

6. The image processing apparatus according to claim 1, wherein the processor changes the position of the certain region in a case where the extracted color data includes portions whose color difference therebetween is equal to or more than a threshold.

7. The image processing apparatus according to claim 6, wherein the processor changes the position until the color difference becomes less than the threshold.

8. The image processing apparatus according to claim 1, wherein the processor changes a position of the certain region in a case where the pre-color conversion image is a trimmed image.

9. The image processing apparatus according to claim 8, wherein the processor changes a location of trimming and the position of the certain region in a case where a color tendency of a portion extracted from the location of trimming is different.

10. A non-transitory computer readable medium storing a program causing a computer to execute a process comprising:
    extracting color data in a certain region of at least one of a pre-color conversion image and a post-color conversion image;

changing at least one of a position and a range of the certain region in a case where the extracted color data meet a certain condition; and preparing a color conversion model using color data in the certain region after being changed.

11. An image processing apparatus comprising:

input means to which a pre-color conversion image and a post-color conversion image are input; and processing means, wherein the processing means is configured to execute a program to extract color data in a certain region of at least one of the pre-color conversion image and the post-color conversion image, change at least one of a position and a range of the certain region in a case where the extracted color data meet a certain condition, and prepare a color conversion model using color data in the certain region after being changed.

\* \* \* \* \*